A. O. ALEXANDER.
FISH HOLDING FRAME.
APPLICATION FILED OCT. 5, 1914.
1,132,417.  Patented Mar. 16, 1915.
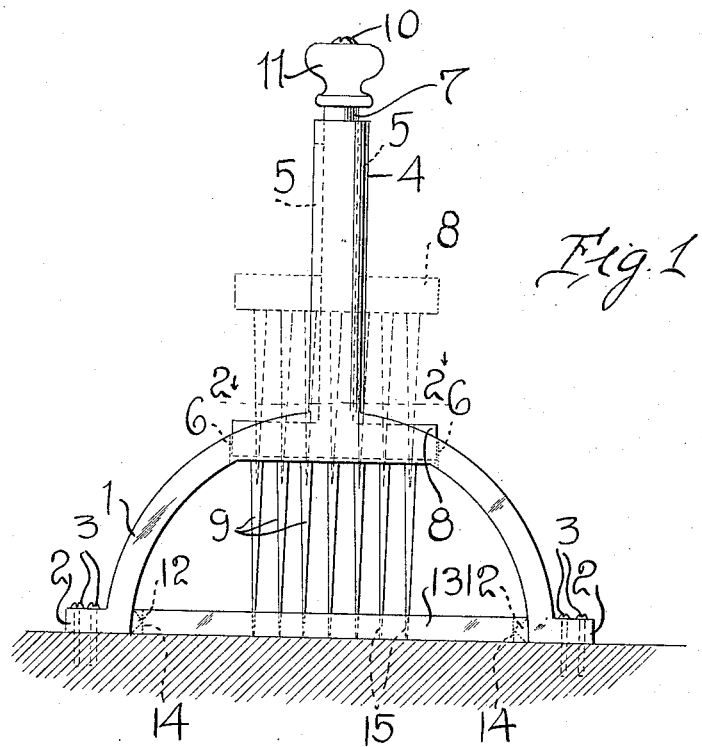
Fig. 1
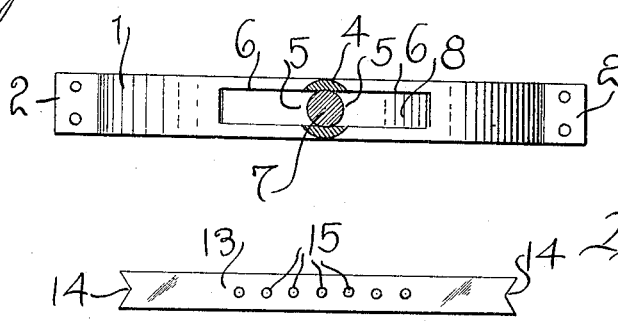
Fig. 2
Fig. 3
Witnesses
Robert M. Sutphen
A. J. Hind
Inventor
A. O. ALEXANDER
By Watson E. Coleman
Attorney

UNITED STATES PATENT OFFICE.

ALBERT O. ALEXANDER, OF FRANKLIN, NEW HAMPSHIRE.

FISH-HOLDING FRAME.

1,132,417.  Specification of Letters Patent.  Patented Mar. 16, 1915.

Application filed October 5, 1914. Serial No. 865,104.

*To all whom it may concern:*

Be it known that I, ALBERT O. ALEXANDER, a citizen of the United States, residing at Franklin, in the county of Merrimack and State of New Hampshire, have invented certain new and useful Improvements in Fish-Holding Frames, of which the following is a specification, reference being had to the accompanying drawings.

This invention relates to fish dressing apparatus, and relates particularly to a frame for holding fish while the same are being scaled or skinned.

An object of this invention is the provision of a fish holding frame which is of such construction, that various sizes of fish may be rigidly held in a position to be scaled or skinned.

A further object of this invention is the provision of a fish holding frame in which fish may be quickly secured, the holding means being readily disengaged from the fish after the same has been scaled.

With these and other objects in view as will become more fully apparent as the description proceeds, my invention consists in the novel construction, combination, and arrangement of parts, to be hereinafter more fully described, claimed, and illustrated in the accompanying drawing, in which—

Figure 1 is a front elevation of a fish dressing apparatus constructed in accordance with my invention; Fig. 2 is a horizontal section thereof on the line 2—2 of Fig. 1; Fig. 3 is a detail view of a base plate hereinafter referred to, the same being shown detached.

Referring more particularly to the drawing, the numeral 1 designates an arched supporting bar, the ends of which are directed laterally as at 2 and apertured for the reception of screws 3 by means of which the bar may be secured to a table or other suitable support. Projecting upwardly from the medial portion of the arched bar 1 is a guide tube 4, the medial portion of the bar having an opening therein which registers with the bore of the tube and is of the same relative diameter. Formed in the tube 4 are diametrically opposed slots 5, which extend from the lower end of the tube to points adjacent the upper end thereof, and formed in the bar 1 on opposite sides of the tube are longitudinal slots 6 which communicate at their inner ends with the lower ends of the slot 5.

Slidably mounted in the tube 4 is a stem 7 upon the lower end of which a block 8 is formed, and projecting downwardly from the block are a plurality of tines 9. The stem 7 projects above the tube 4, and secured upon the stem by a set screw 10 is a knob 11 by means of which the stem may be raised to space the lower ends of the tines from the support. Extending inwardly from the ends of the arched bar 1 are tapered lugs 12, and adapted for engagement between the ends of the bar is a base plate 13 in the ends of which notches 14 are formed to receive the lugs 12 whereby the base bar is held in position. Formed in the base bar intermediate of its ends is a longitudinal series of openings 15 which are adapted to receive the lower ends of the tines 9 to prevent bending of the tines when the device is in use.

It will be seen that the cross bar 8 and the tines 9 on the one hand, and the base bar 13 on the other, form complemental members which both together act to hold the fish securely in position. It is to be further noted that inasmuch as there are a plurality of tines 9 arranged in a single line, the fish when engaged by the tines will be held firmly and from any turning movement. Furthermore, it is noted that the bar 8 engages in the slot 6 when depressed and therefore a strain placed upon the fish contained in it will be strongly resisted and the device will not turn about the axis of the plunger 7.

In the practical use of my device, the stem 7 is raised to space the tines from the base plate 13, so that the tail of the fish may be engaged against the base bar when it is desired to scale the fish, or the head of the fish may be engaged against the base bar below the tines when it is desired to skin the fish. With the head or tail of the fish arranged against the base bar below the tines, the stem is forced downwardly to cause the pointed ends of the tines 9 to pierce the fish, so that the same is rigidly held in a position for scaling or skinning. When the tines are forced through the fish, the extremities of the tines engage in the openings 15 in the base plate, whereby the tines will be braced upon any pull upon the fish, and in this manner bending or breaking of the tines is prevented.

It will be seen from the drawing, that when the device is in a position for use, the block 8 is engaged in the slots 6, and when the stem is in raised position, the block projects through the slots 5 in the tube, so that regardless of the position of the block, the same is prevented from turning relative to the support, whereby the tines will always be in a position for entrance into the openings 15.

It will of course be understood that if desired, the ends of the arched bar 1 may be hingedly connected to the support so that when the device is not in use, the same may be folded upon the support, and that by detachably connecting one end of the arched bar to the support, the device may be raised to dispose the tail or head of a very large fish beneath the bar 1.

Having thus fully described my invention, what I desire to claim and secure by Letters Patent is:

1. A fish holder including an arched support, a base member formed with perforations disposed beneath said support, said support at its apex being transversely slotted and having a tubular upward extension likewise transversely slotted, a transversely extending head disposed in the slot of the extension and movable into the slot in the supporting member, and a plunger connected with the head and extending out of said extension, said head being formed with a plurality of downwardly extending sharp pointed tines insertible in the perforations of the base member when the head is depressed.

2. A device of the character described, including an arched support, inwardly extending lugs formed upon the support at its ends, a base member disposed between the ends of the support and having notches engaging the lugs whereby the plate is detachably held in position, a head slidably mounted on the arched support above the base member, and projecting downward from the head and engageable in the perforations of the base member.

In testimony whereof I hereunto affix my signature in the presence of two witnesses.

ALBERT O. ALEXANDER.

Witnesses:
  WILLIE A. SANBORN,
  DAVID A. JULIERT.

Copies of this patent may be obtained for five cents each, by addressing the "Commissioner of Patents, Washington, D. C."